(12) United States Patent
Downing

(10) Patent No.: US 6,499,939 B2
(45) Date of Patent: Dec. 31, 2002

(54) WATER WHEEL

(76) Inventor: Eric E Downing, 30921 Orwell Rd., Ontario, WI (US) 54651

( * ) Notice: Subject to any disclaimer, the term of this patent is extended or adjusted under 35 U.S.C. 154(b) by 0 days.

(21) Appl. No.: 09/817,988

(22) Filed: Mar. 27, 2001

(65) Prior Publication Data

US 2002/0141858 A1 Oct. 3, 2002

(51) Int. Cl.[7] .................................................. F03B 7/00
(52) U.S. Cl. ........................ 415/3.1; 416/119; 416/140
(58) Field of Search .......................... 415/2.1, 3.1, 4.1, 415/4.2, 4.4, 121.2, 208.1; 416/9, 17, 117, 119, 140

(56) References Cited

U.S. PATENT DOCUMENTS

| | | | | |
|---|---|---|---|---|
| X000,001 I1 | * | 4/1831 | Coney | 416/119 |
| 4,517 A | * | 5/1846 | Hand | 416/119 X |
| 4,843 A | * | 11/1846 | Rowand | 415/3.1 |
| 98,891 A | * | 1/1870 | Sovy | 416/119 |
| 113,284 A | * | 4/1871 | Folson | 416/119 |
| 203,382 A | * | 5/1878 | Smith | 416/117 |
| 302,769 A | * | 7/1884 | Pallausch | 416/119 |
| 4,156,580 A | * | 5/1979 | Pohl | 415/4.2 |
| 4,424,451 A | * | 1/1984 | Schmidt | 416/119 X |
| 5,051,059 A | * | 9/1991 | Rademacher | 415/3.1 X |
| 5,098,264 A | * | 3/1992 | Lew | 416/119 |
| 6,006,518 A | * | 12/1999 | Geary | 60/398 |

FOREIGN PATENT DOCUMENTS

| | | | | | |
|---|---|---|---|---|---|
| FR | 2286955 A | * | 4/1976 | | 415/402 |
| JP | 56-14870 A | * | 2/1981 | | 416/17 |
| JP | 56-20776 A | * | 2/1981 | | 416/17 |

* cited by examiner

Primary Examiner—John E. Ryznic
(74) Attorney, Agent, or Firm—Michael I. Kroll

(57) ABSTRACT

The present invention 10 discloses a wheel-like member 30 consisting of a central circular body member 18 having a plurality of spokes 22 radiating from its outside perimeter that attach to the inside perimeter of an outer circular body member 24. On the outside perimeter of the outer circular body member a plurality of hinges 26 with paddles 16 are attached thereto that can only open to a pre-determined angle "A" from the wheel 30 that ensures water current 14 is caught by the paddles on only one side of the wheel which causes the wheel to rotate in only one direction. The kinetic energy stored in the wheel 30 while rotating is harnessed through a drive shaft 34 connected to the central circular body member 18 that connects to a generator 36 placed perpendicular to the central circular body member 18. To keep the generator 36 and drive shaft 34 in place a plurality of support members 40, with cross-member support couplers 48 are disposed into the bed 42 of the river or ocean that the device 10 is being used in.

1 Claim, 15 Drawing Sheets

WATER WHEEL

BACKGROUND OF THE INVENTION

1. Field of the Invention

The present invention relates generally to a water wheel and, more specifically, to a water wheel that gains its power and momentum through water current acting upon a plurality of paddles attached to hinges that open to a pre determined angle that are attached to the outer perimeter of a wheel. The wheel consists of a central circular body member with a plurality of spokes radiating from its outside perimeter that attach to the inside perimeter of an outer circular body member. On the outside perimeter of the outer circular body member a plurality of hinges with paddles are attached that can only open to a pre determined angle from the wheel that ensures water current is caught by the paddles on only one side of the wheel which causes it to rotate. The kinetic energy stored in the wheel while rotating is harnessed through a drive shaft connected to the central circular body member that connects to a generator placed perpendicular to the central circular body member. To keep the generator and drive shaft in place a plurality of support members, with couplers for the drive shaft, are dug into the bed of the river or ocean that the device is used in.

2. Description of the Prior Art

There are other water wheel devices designed for energy production but while these water wheels may be suitable for the purposes for which they were designed, they would not be as suitable for the purposes of the present invention, as hereinafter described.

SUMMARY OF THE PRESENT INVENTION

The present invention discloses a wheel-like member consisting of a central circular body member having a plurality of spokes radiating from its outside perimeter that attach to the inside perimeter of an outer circular body member. On the outside perimeter of the outer circular body member a plurality of hinges with paddles are attached thereto that can only open to a pre-determined angle "A" from the wheel that ensures water current is caught by the paddles on only one side of the wheel which causes the wheel to rotate in only one direction. The kinetic energy stored in the wheel while rotating is harnessed through a drive shaft connected to the central circular body member that connects to a generator placed perpendicular to the central circular body member. To keep the generator and drive shaft in place a plurality of support members, with cross-member support couplers are disposed into the bed of the river or ocean that the device is being used in.

A primary object of the present invention is to provide a water wheel that may be used in an environment with multiple water currents.

Another object of the present invention is to provide a water wheel with a plurality of paddles with hinges attached to its outside perimeter that only open to a predetermined angle from the wheel.

Yet another object of the present invention is to provide a water wheel that does not harm the wildlife or block current greatly where it is used.

Still yet another object of the present invention is to provide a water wheel that when paddles are closed may direct water into open paddles.

Yet another object of the present invention is to provide a water wheel with a drive shaft and generator that produces power.

Additional objects of the present invention will appear as the description proceeds.

The present invention overcomes the shortcomings of the prior art by providing a water wheel that when influenced by current can rotate and produce power by usage of a plurality of paddles with hinges that open to a predetermined angle from the wheel, so that water current can be directed into and caught by the open paddles. The present invention also provides a water wheel that can be used in an environment with multiple and alternating currents without blocking water or harming the environment and wildlife.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
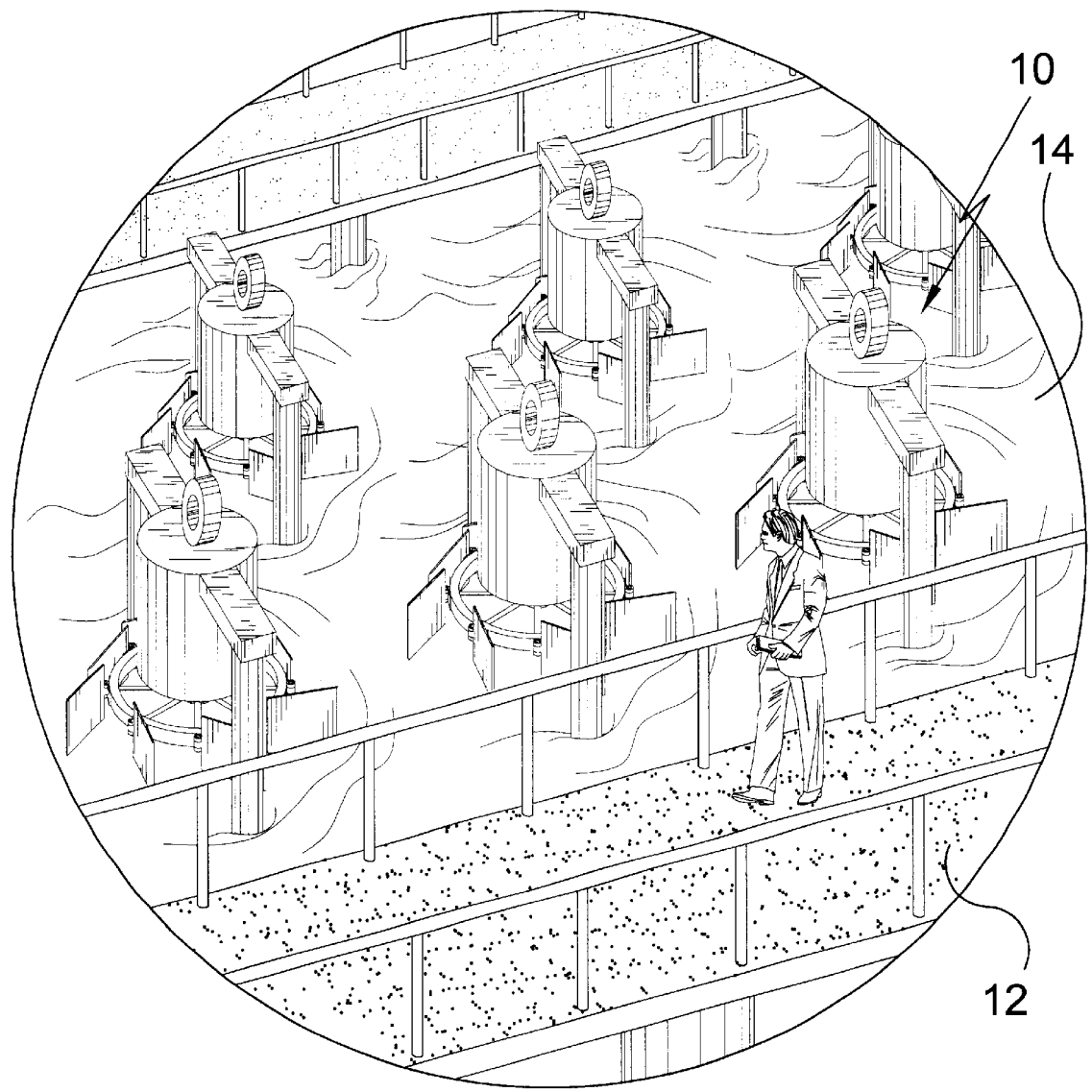
FIG. 1 is a perspective view of the present invention.

With regard to reference numerals used, the following numbering is used throughout the drawings.

10 present invention
12 plant
14 flowing water
16 paddle
18 central body member
20 connection means
22 spokes
24 outer body member
26 hinge
28 stop member
30 wheel
32 obstruction 34 drive shaft
36 generator
38 frame
40 support legs
42 bed
44 water line
46 crane loop
48 cross support member
50 debris deflector

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

FIG. 1 is a perspective view of the present invention showing the present invention 10 in use in a large-scale power plant or the like 12 with a plurality of the devices being generally horizontally disposed and operating in a river 14 or other body of flowing water.

Figure 2:
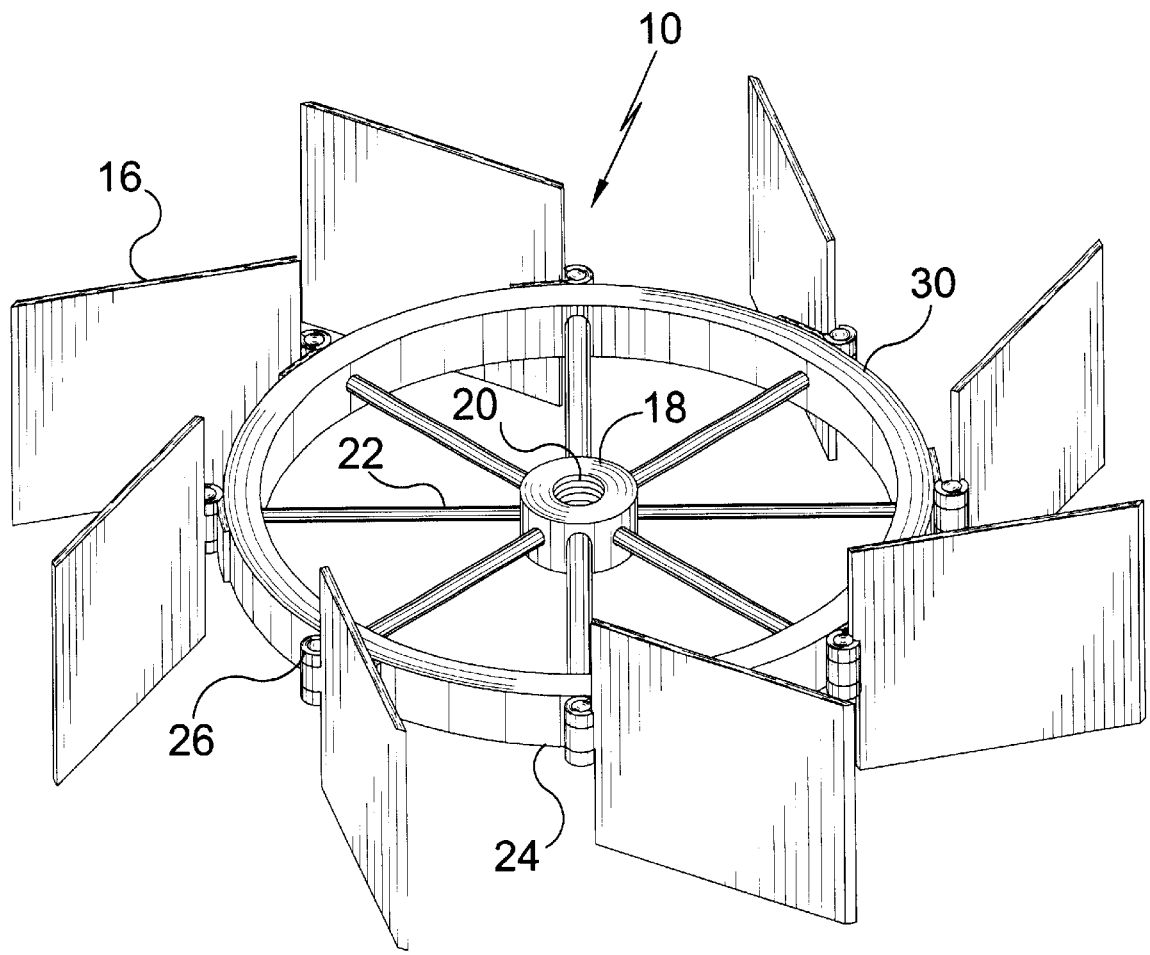
FIG. 2 is a top view of the present invention.

FIG. 2 is a top view of the present invention showing the present invention 10 having a plurality of paddles 16 with which to capture the energy from the water current. Shown therein is a central circular body member 18 which forms a hub-like central member having a means for rotatable connection 20 centrally disposed therein having a plurality of spokes 22 radiating radially therefrom to an outer, wheel-like, circular, ring-like body member 24 which may also be referred to hereinafter as a wheel 30. It can be seen that the panels 16 having means for connection or hinges 26 disposed about the outer periphery of the outer circular body member 24.

Figure 3:
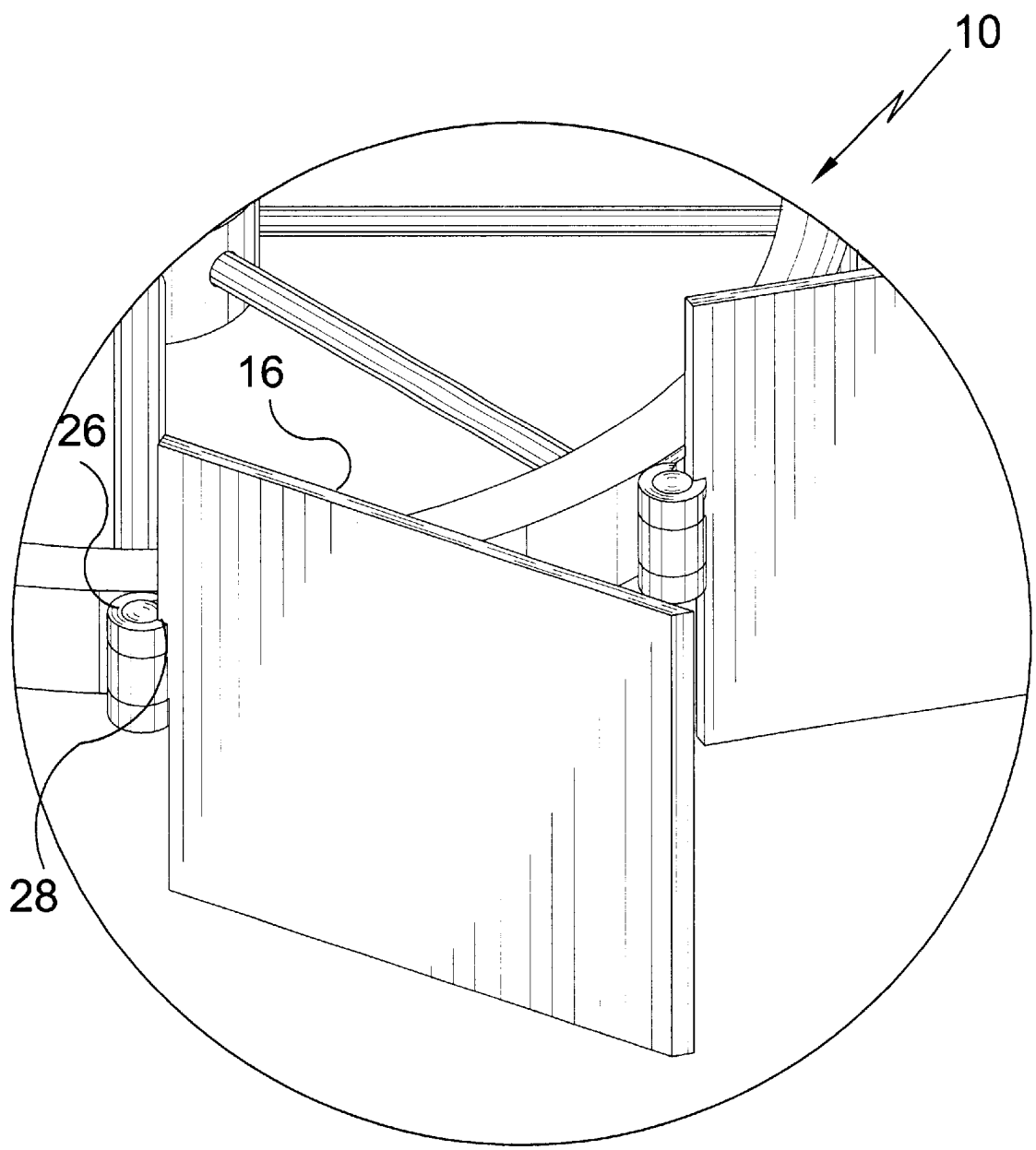
FIG. 3 is an isometric view of the present invention.

FIG. 3 is an isometric view of the present invention showing the present invention 10 having a stopper member 28 to prevent the paddle 16 from opening more than the predetermined angle. Hinge member 26 is also shown.

Figure 4:
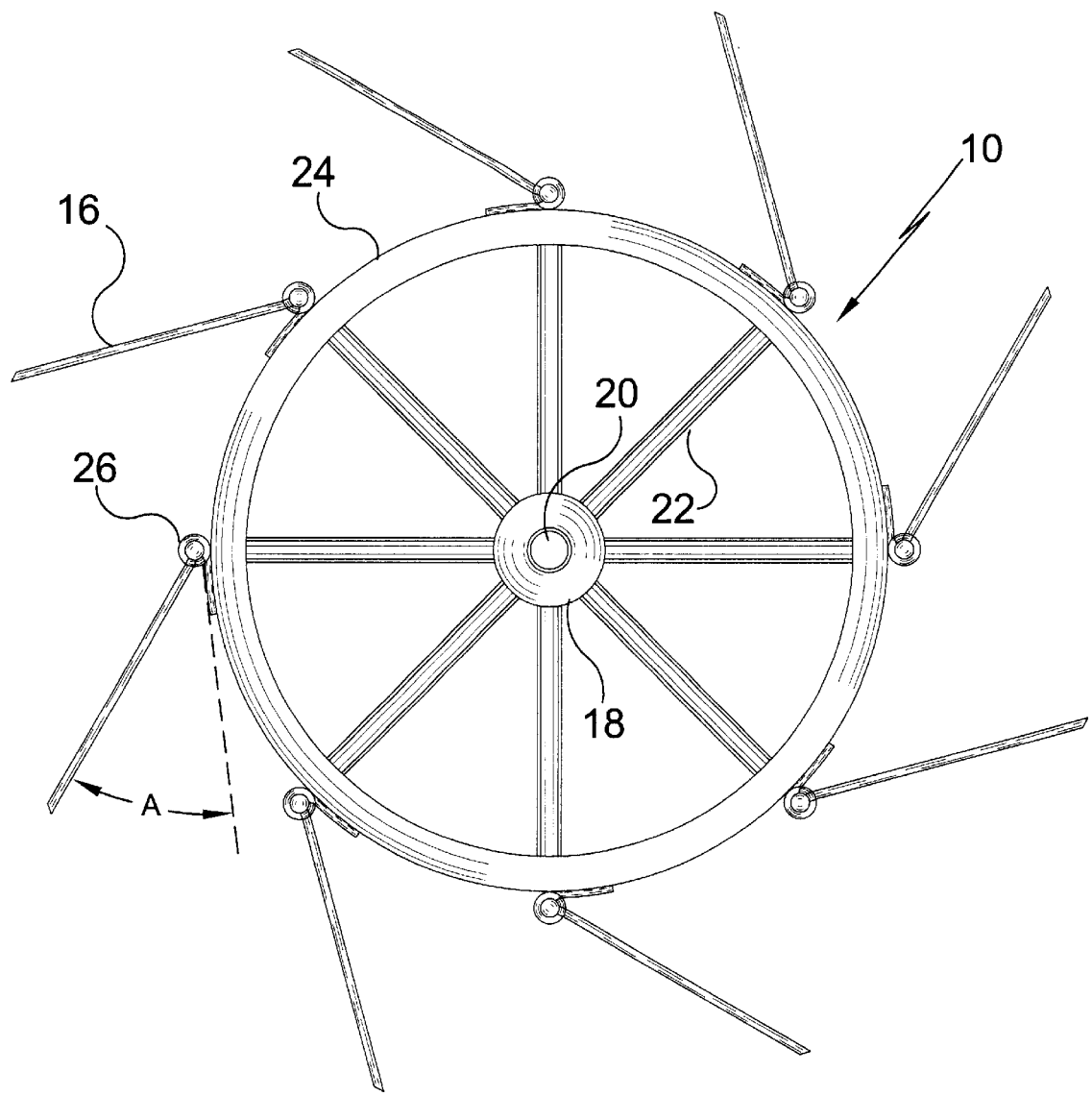
FIG. 4 is a top view of the present invention.

FIG. 4 is a top view of the present invention showing the present invention 10 having a central circular body member 18 fixedly attached to an outer circular body member 24 by multiple spokes 22. Also shown is a plurality of hinges 26 surrounding the outside perimeter of outer member 24 for attachment of multiple paddles 16 thereto. A central connection member 20 is also shown. Angle "A" indicates the maximum angular opening of the paddles 16 with respect to the tangent line of outer member 24.

Figure 5:
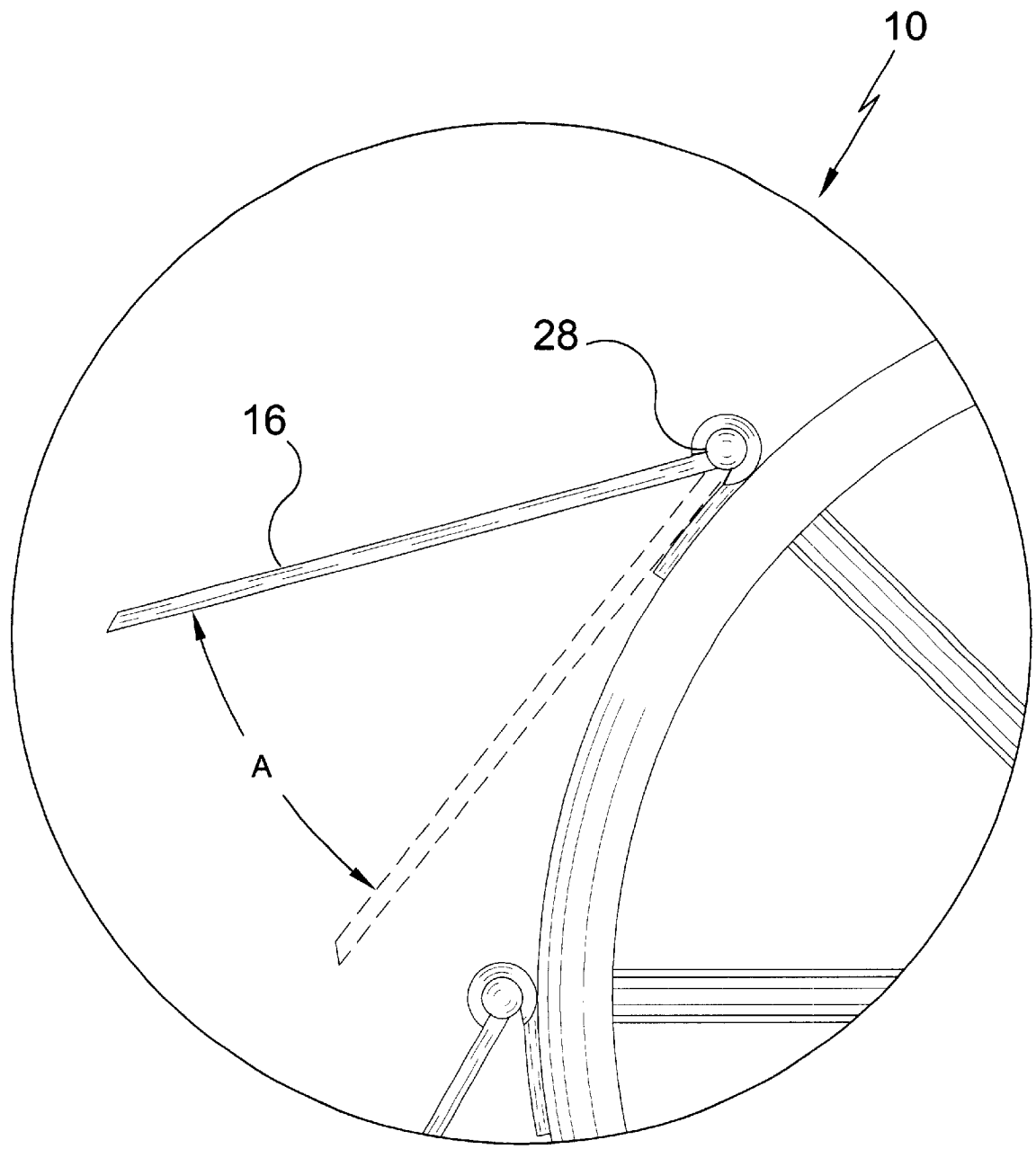
FIG. 5 is a top view of the present invention.

FIG. 5 is a top view of the present invention 10 showing the paddle 16 open to "A" degrees before engaging the paddle opening delimiter or stop 28. It is believed that the preferred embodiment angle "A" is about 30 degrees for optimal performance being in the range of 25–35 degrees; however, it is believed that other angles could also be successfully utilized.

Figure 6:
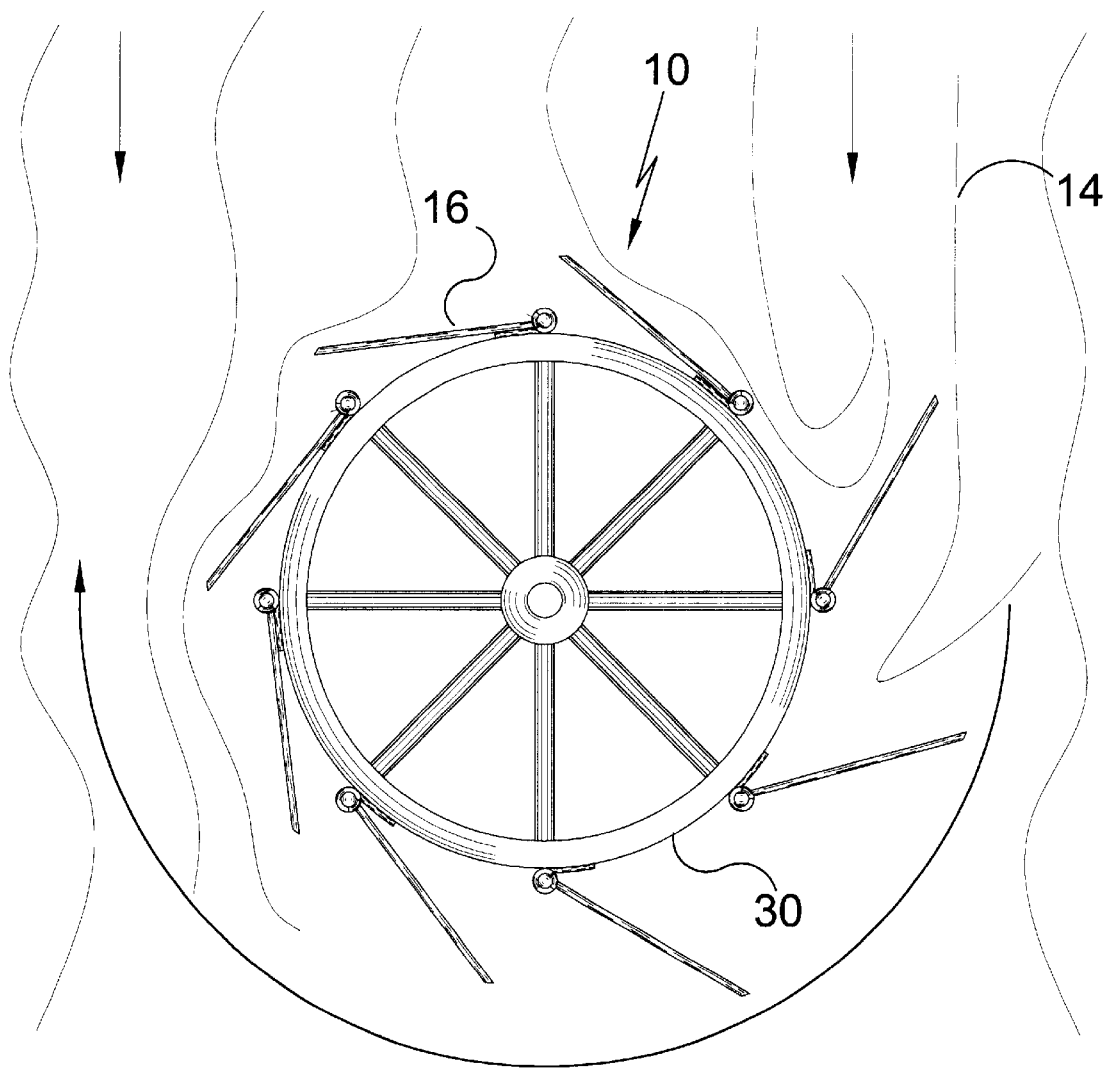
FIG. 6 is a top view of the present invention.

FIG. 6 is a top view of the present invention showing the present invention 10 in operation with the current 14 coming from a forward direction. Also shown are the paddles 16 opening to a predetermined angle to catch or capture the current 14 on one side of wheel 30 while on the opposing side the paddles are closed to deflect the current. Other elements previously disclosed are also shown.

Figure 7:
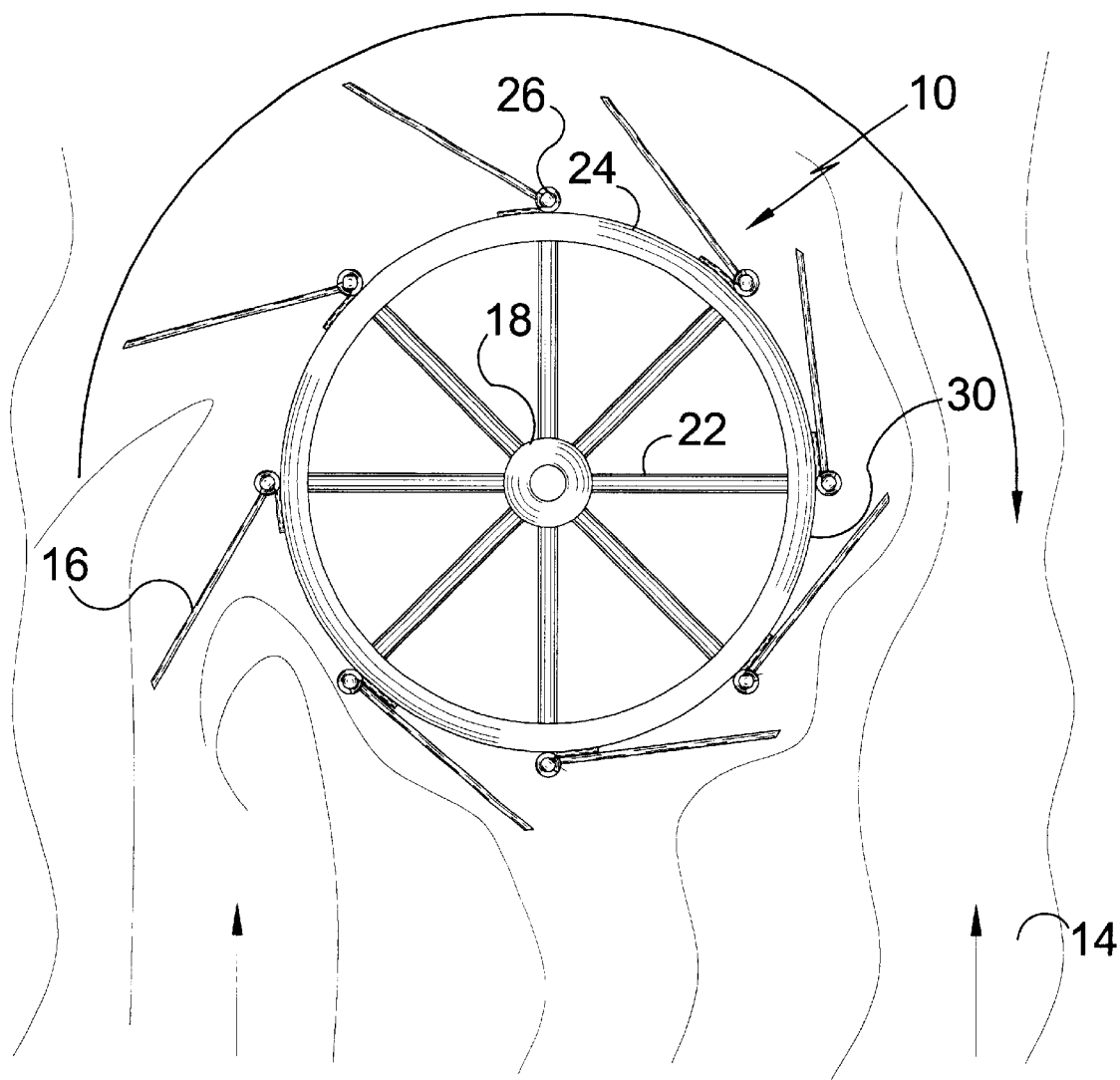
FIG. 7 is a top view of the present invention.

FIG. 7 is a top view of the present invention 10 showing the present invention in operation with the current 14 coming in the reverse direction. Also shown is the wheel 30 not changing its direction of rotation but instead conforming to the change in current direction by having the paddles 16 open on the opposite side of outer member 24. Other elements previously disclosed are also shown.

Figure 8:
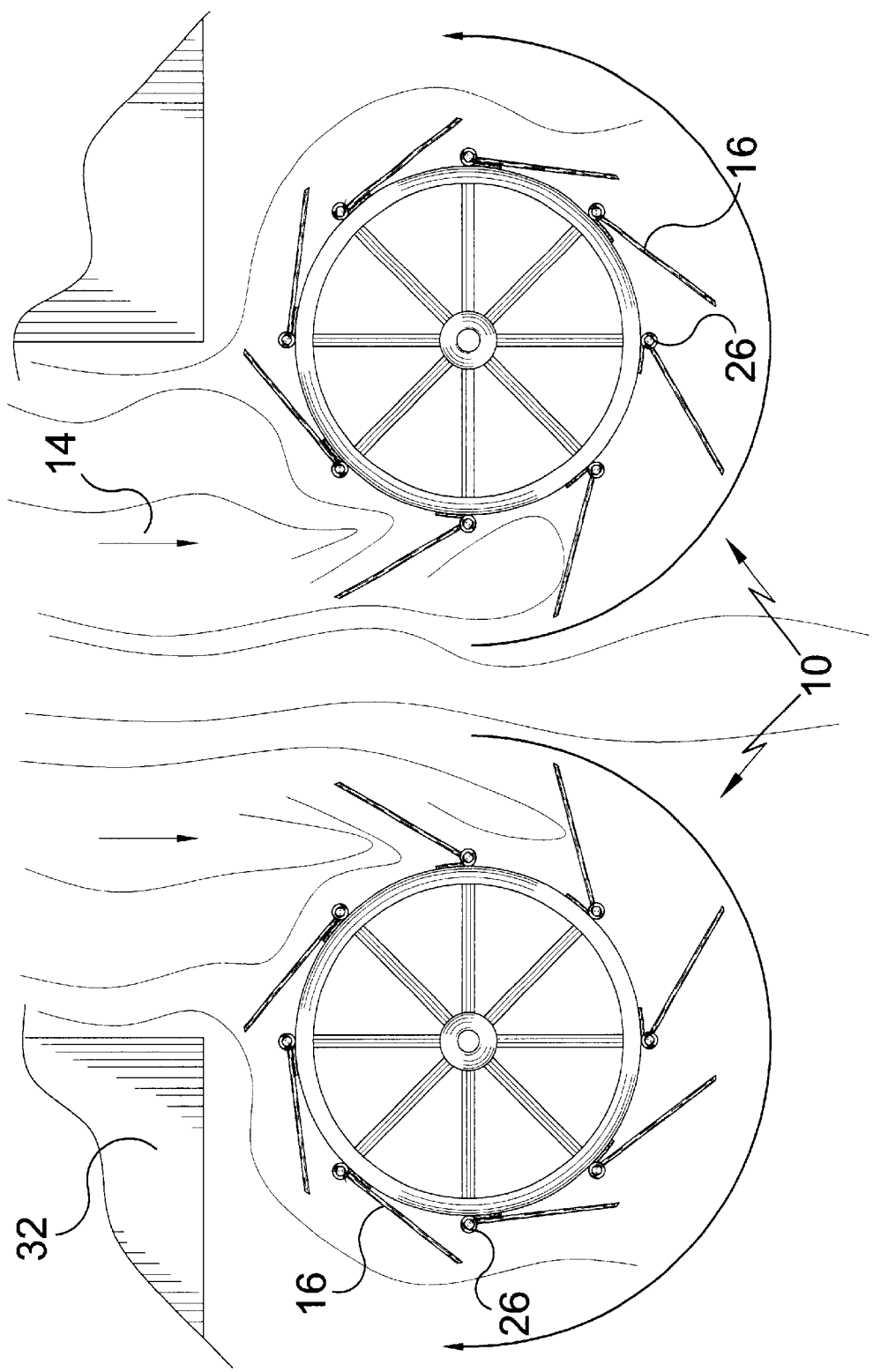
FIG. 8 is a top view of the present invention.

FIG. 8 is a top view of the present invention showing the present invention 10 in operation with a plurality of devices 10 placed on the sides of existing obstructions 32 that water flows 14 around. Other elements previously disclosed are also shown.

Figure 9:
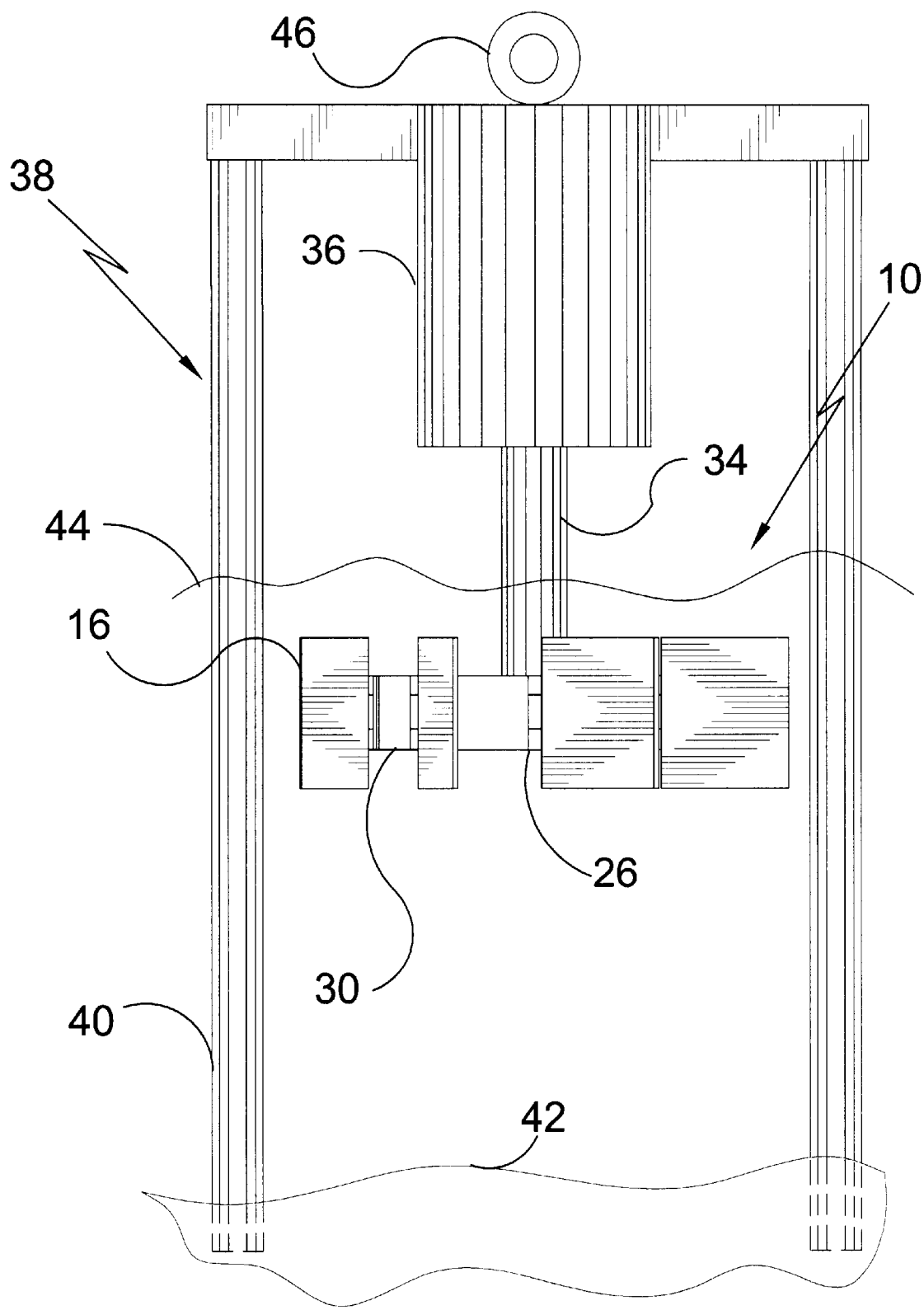
FIG. 9 is a side view of the present invention.

FIG. 9 is a side view of the present invention showing the present invention 10 having a drive shaft 34 with a generator 36 connected at its opposing side from the wheel 30 to harness the kinetic energy produced by the wheel 30 while it rotates. Also shown is a generally upright standing frame member 38 having support members or legs 40 which are mounted by penetration into the bed 42 of the river or the like further showing the water line 44 of the water body. Also shown is a crane loop 46 for lifting the present invention. Other elements previously disclosed are also shown.

Figure 10:
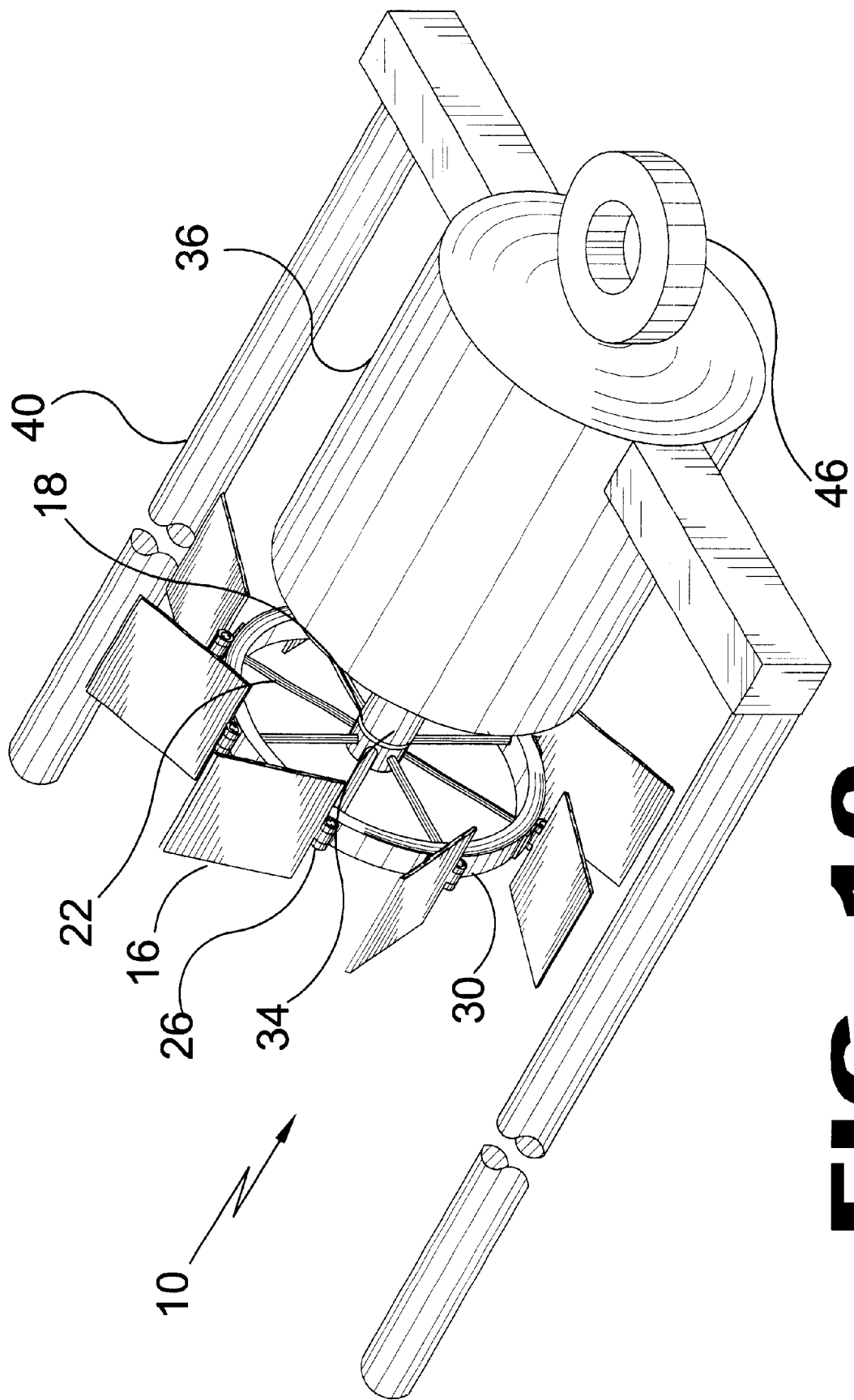
FIG. 10 is an isometric view of the present invention.

FIG. 10 is an isometric view of the present invention 10 showing the present invention having a generator 36 mounted on the top portion of the wheel 30. Other elements previously disclosed are also shown.

Figure 11:
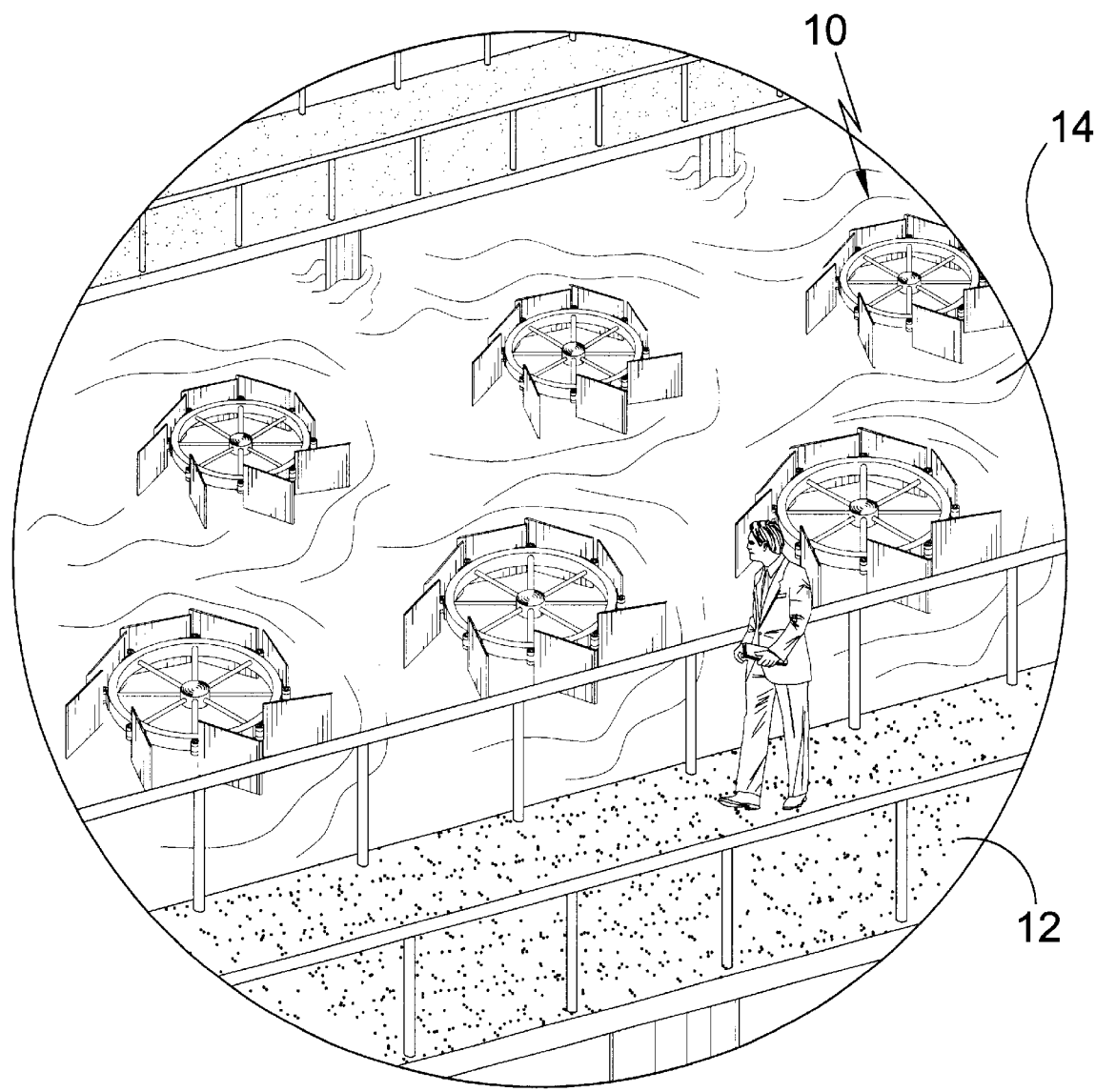
FIG. 11 is a perspective view of the present invention.

FIG. 11 is a perspective view of the present invention 10 showing the devices 10 in use in a large scale power plant or the like 12 with a plurality of devices 10 operating in a river or other body of flowing water 14.

Figure 12:
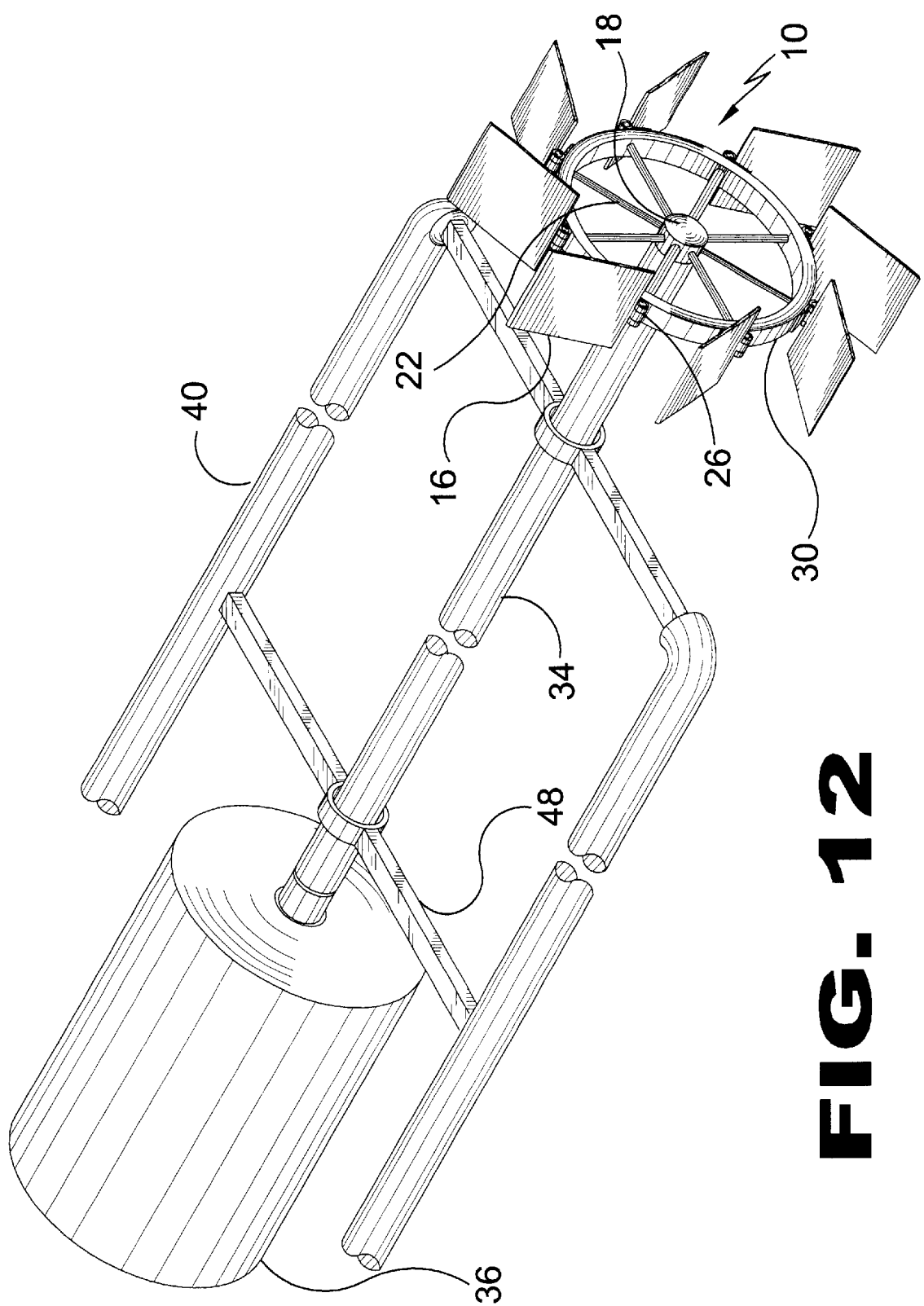
FIG. 12 is an isometric view of the present invention.

FIG. 12 is an isometric view of the present invention 10 showing the present invention having a plurality of support cross members or couplers 48 to hold the drive shaft 34 steady while in operation. Other elements previously disclosed are also shown.

Figure 13:
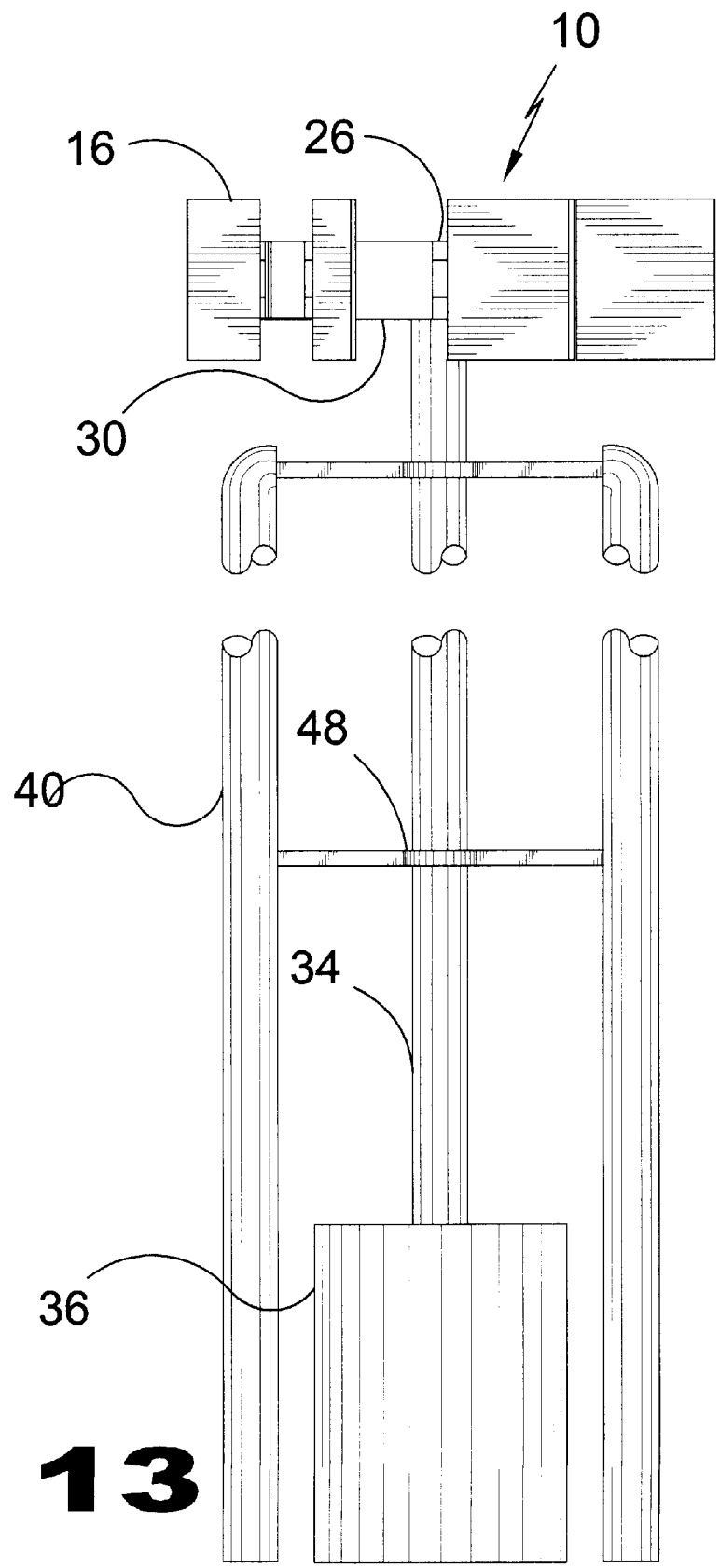
FIG. 13 is a side view of the present invention.

FIG. 13 is a side view of the present invention showing the present invention 10 having a drive shaft 34 with a generator 36 connected at its opposing side from the wheel 30 to harness the kinetic energy produced by the wheel 30 while it rotates. Other elements previously disclosed are also shown.

Figure 14:
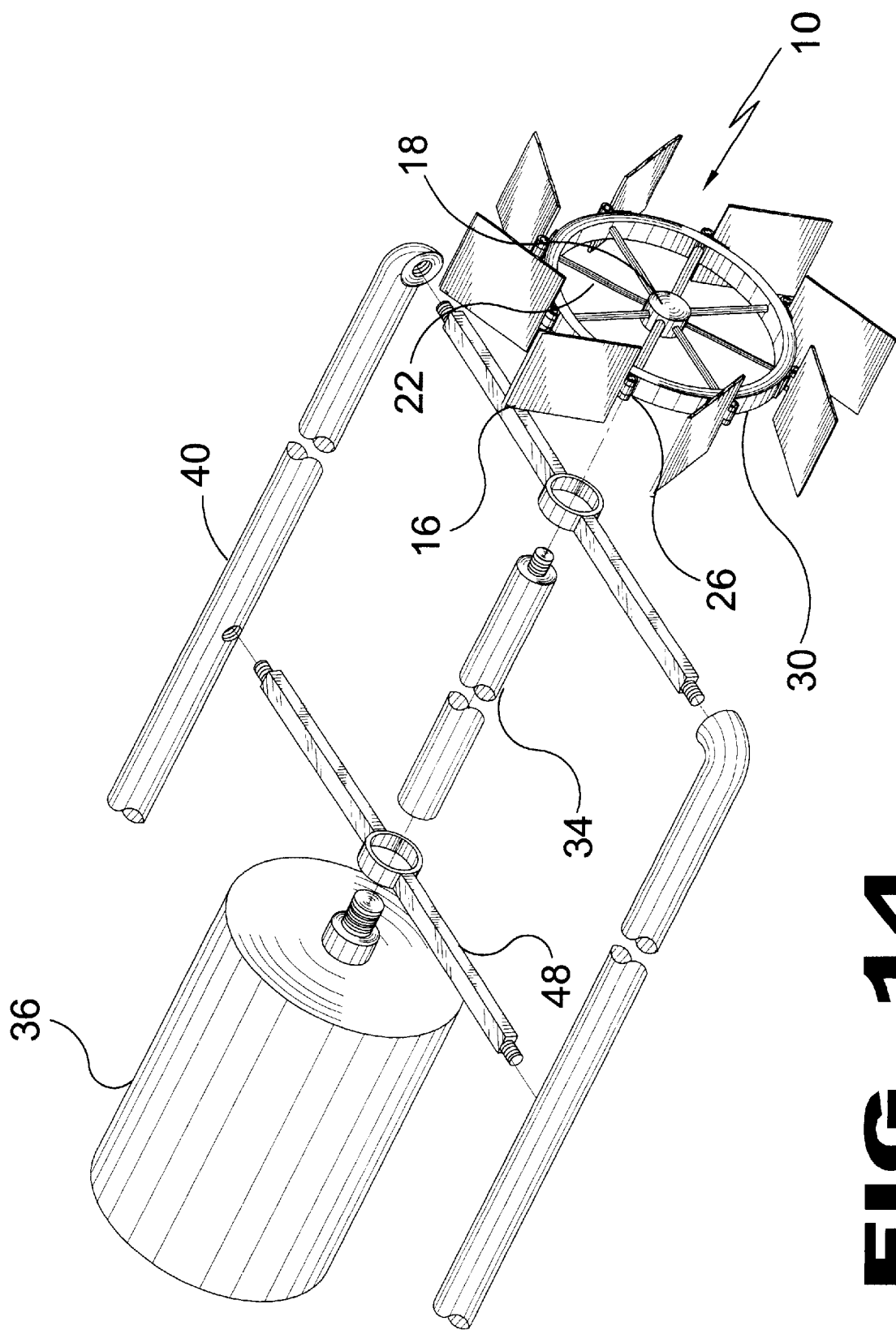
FIG. 14 is an exploded view of the present invention.

FIG. 14 is an exploded view of the present invention showing the present invention 10 with all of its main structural components exploded into their individual elements as previously disclosed.

Figure 15:
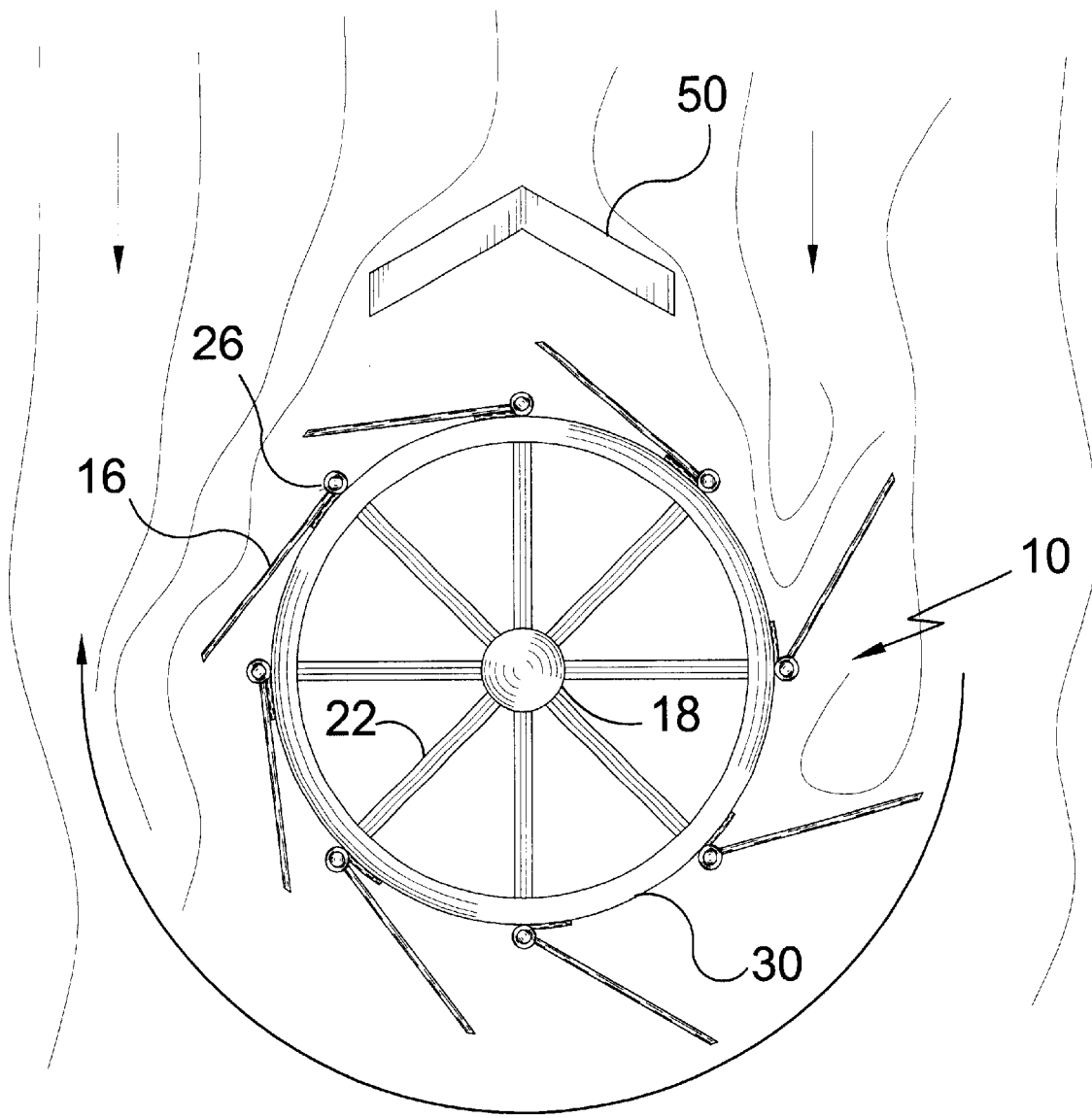
FIG. 15 is a top view of the present invention.

FIG. 15 is a top view of the present invention showing the present invention 10 having an addition of a debris deflector 50 that may be used to prevent damage to the wheel 30 that may occur due to drifting debris. Other elements previously disclosed are also shown.

I claim:

1. An apparatus for a water wheel for use in a flowing body of water, comprising:
   a) a wheel, said wheel being rotatable, said wheel being generally horizontally disposed;
   b) a central body member disposed internal of said wheel;
   c) a shaft upon which said wheel rotates;
   d) a first means for connecting said wheel to said shaft;
   e) an outer body member disposed about said central body member;
   f) a second means for connecting said outer body member to said central body member;
   g) means for a plurality of paddles disposed on the perimeter of said outer body member whereby energy from the flowing body of water is captured;

h) means for mounting the apparatus in a flowing body of water whereby the apparatus is securely supported;

i) a hinge for connecting said paddles to said outer body member, said hinge being disposed on the outer periphery of said outer body member;

j) a stop being disposed on said hinge so that said paddles open to a fixed maximum degree relative to a tangent line of said outer body member;

k) means for a generator disposed on said shaft whereby electricity is generated by the rotation of said wheel by the body of water;

l) means for deflecting debris disposed proximate to said wheel whereby contact with debris in the water body is prevented; and m) a crane loop being disposed on said top end of said frame member, wherein said central body member is a hub, said hub having an aperture therein, said aperture receives said shaft, said first means for connecting said wheel to said shaft further comprises said shaft connecting to said hub by using said aperture, said shaft is disposed perpendicular to said wheel, said outer body member is a ring disposed about said central body member, said second means for connecting said outer body member to said central body member further comprises a plurality of spokes, said means for a plurality of paddles further comprises said paddles being generally perpendicular to said outer body member, said paddles open to an angle of about 30 degrees relative to a tangent line of said outer body member, said means for mounting further comprises a generally upright standing frame member having the apparatus disposed thereon, said frame member having an upper end and a lower end, said lower end of said frame member being disposed into the bed of the body of water, said frame member further comprises at least one supporting cross member.

* * * * *